United States Patent
Okuda et al.

(10) Patent No.: US 9,463,789 B2
(45) Date of Patent: Oct. 11, 2016

(54) CONTROL DEVICE FOR VEHICLE

(75) Inventors: Koichi Okuda, Toyota (JP); Atsushi Tabata, Okazaki (JP); Keita Imai, Toyota (JP); Tooru Matsubara, Toyota (JP); Tatsuya Imamura, Okazaki (JP); Takeshi Kitahata, Toyota (JP); Kenta Kumazaki, Toyota (JP); Shunya Kato, Toyota (JP); Yasuhiro Hiasa, Toyota (JP); Yuji Iwase, Mishima (JP); Hiroyuki Shibata, Toyota (JP)

(73) Assignee: TOYOTA JIDOSHA KABUSHIKI KAISHA, Toyota-Shi (JP)

( * ) Notice: Subject to any disclaimer, the term of this patent is extended or adjusted under 35 U.S.C. 154(b) by 0 days.

(21) Appl. No.: 14/367,569

(22) PCT Filed: Dec. 21, 2011

(86) PCT No.: PCT/JP2011/079731
§ 371 (c)(1),
(2), (4) Date: Jun. 20, 2014

(87) PCT Pub. No.: WO2013/094043
PCT Pub. Date: Jun. 27, 2013

(65) Prior Publication Data
US 2014/0358349 A1 Dec. 4, 2014

(51) Int. Cl.
*B60W 20/10* (2016.01)
*B60W 20/00* (2016.01)
*B60W 10/08* (2006.01)
*B60K 6/445* (2007.10)
*B60K 6/38* (2007.10)

(52) U.S. Cl.
CPC .............. *B60W 20/10* (2013.01); *B60K 6/445* (2013.01); *B60W 10/08* (2013.01); *B60W 20/00* (2013.01); *B60K 2006/381* (2013.01); *Y02T 10/6239* (2013.01)

(58) Field of Classification Search
CPC ..... B60W 10/08; B60W 20/00; B60K 6/445; B60K 23/0808; B60K 23/0816; B60K 23/0833; B60K 23/0841; Y02T 10/6286; Y02T 10/648
See application file for complete search history.

(56) References Cited

U.S. PATENT DOCUMENTS

2001/0027146 A1* 10/2001 Spaziani et al. .................. 477/3
2009/0275439 A1* 11/2009 Kersting ........................... 475/5

(Continued)

FOREIGN PATENT DOCUMENTS

| JP | 2002176703 A | 6/2002 |
|----|--------------|--------|
| JP | 2003-327001 A | 11/2003 |
| JP | 2006347240 A | 12/2006 |
| JP | 2008-265600 A | 11/2008 |

(Continued)

*Primary Examiner* — Abby Lin
(74) *Attorney, Agent, or Firm* — Kenyon & Kenyon LLP

(57) ABSTRACT

A control device of a vehicle includes a first electric motor; a differential mechanism having a rotating element coupled to the first electric motor, a rotating element that is an output rotating member coupled to drive wheels in a power transmittable manner, and a rotating element coupled to a non-rotating member by actuation of a lock mechanism; and a second electric motor coupled to the drive wheels in a power transmittable manner. During motor running for running with output torques from the first electric motor and the second electric motor used together in an actuated state of the lock mechanism, a drive torque shared by the first electric motor is made smaller in a requested drive torque when a rotation speed of a pinion making up the differential mechanism is higher.

7 Claims, 7 Drawing Sheets

(56) References Cited

U.S. PATENT DOCUMENTS

| | | | |
|---|---|---|---|
| 2010/0222953 A1* | 9/2010 | Tang | 701/22 |
| 2011/0024211 A1* | 2/2011 | Kikuchi | 180/65.25 |
| 2011/0143875 A1 | 6/2011 | Ono et al. | |

FOREIGN PATENT DOCUMENTS

| | | |
|---|---|---|
| JP | 2010083361 A | 4/2010 |
| JP | 2010100216 A | 5/2010 |
| JP | 2010120636 A | 6/2010 |

\* cited by examiner

CONTROL DEVICE FOR VEHICLE

CROSS-REFERENCE TO RELATED APPLICATIONS

This is a national phase application based on the PCT International Patent Application No. PCT/JP2011/079731 filed Dec. 21, 2011, the entire contents of which are incorporated herein by reference.

TECHNICAL FIELD

The present invention relates to a control device of a vehicle including a differential mechanism having a rotating element configured to be lockable different from rotating elements respectively coupled to a first electric motor and drive wheels and particularly to a technique of suppressing reduction in durability of the differential mechanism during motor running for running with a lock actuated.

BACKGROUND ART

A vehicle is well-known that includes a first electric motor; a differential mechanism having a rotating element coupled to the first electric motor, a rotating element that is an output rotating member coupled to drive wheels in a power transmittable manner, and a rotating element coupled to a non-rotating member by actuation of a lock mechanism; and a second electric motor coupled to the drive wheels in a power transmittable manner. For example, this corresponds to a vehicle described in Patent Document 1. Patent Document 1 proposes that, in a vehicle including an engine; a first electric motor; a differential mechanism including three rotating elements respectively coupled to three shafts, i.e., a crankshaft of the engine, a rotation shaft of the first electric motor, and a drive shaft coupled to axles; a second electric motor coupled to the drive shaft; and a lock mechanism non-rotatably fixing the crankshaft of the engine, while the engine is put into an operation stop state and the crankshaft of the engine is non-rotatably fixed by the lock mechanism, the first electric motor and the second electric motor are efficiently used together as a drive force source for running such that a request drive torque is satisfied so as to perform motor running.

PRIOR ART DOCUMENT

Patent Document

Patent Document 1: Japanese Laid-Open Patent Publication No. 2008-265600

SUMMARY OF THE INVENTION

Problem to be Solved by the Invention if the first electric motor and the second electric motor are used together during motor running, power of the second electric motor is transmitted to the drive wheels without passing through the differential mechanism. On the other hand, power of the first electric motor is transmitted via the differential mechanism (particularly, a pinion (e.g., a planetary gear) making up the differential mechanism) to an output rotating member (i.e., drive wheel side). Therefore, for example, if rotation speed of the pinion (pinion's axial rotation speed or pinion's relative rotation speed (differential rotation speed)) is increased due to vehicle speed, durability of the differential mechanism may be more reduced as a larger first electric motor torque is transmitted. If a physical countermeasure such as increasing a lubrication oil amount of the differential mechanism is taken for transmitting the larger first electric motor torque, fuel efficiency may deteriorate. The problem described above is unknown and no proposal has hitherto been made on properly using the first electric motor and the second electric motor together during motor running in terms of improvement in durability of the differential mechanism.

The present invention was conceived in view of the situations and it is therefore an object of the present invention to provide a control device of a vehicle capable of suppressing reduction in durability of a differential mechanism without a physical countermeasure during motor running using a first electric motor and a second electric motor together as a drive force source for running.

Means for Solving the Problem

To achieve the object, the first aspect of the invention provides (a) a control device of a vehicle including a first electric motor; a differential mechanism having a rotating element coupled to the first electric motor, a rotating element that is an output rotating member coupled to drive wheels in a power transmittable manner, and a rotating element coupled to a non-rotating member by actuation of a lock mechanism; and a second electric motor coupled to the drive wheels in a power transmittable manner, wherein (b) during motor running for running with output torques from the first electric motor and the second electric motor used together in an actuated state of the lock mechanism, a drive torque shared by the first electric motor is made smaller in a requested drive torque when a rotation speed of a pinion making up the differential mechanism is higher.

Effects of the Invention

As a result, since the output torque of the first electric motor is reduced when the rotation speed of the pinion (axial rotation speed of the pinion or differential rotation speed of the pinion) is higher, i.e., since the output torque of the first electric motor transmitted via the pinion is reduced even when the rotation speed of the pinion is higher, the durability of the differential mechanism (e.g., seizure resistance of the bearing of the pinion) is improved. This eliminates the need for providing a special lubrication path or increasing a lubrication oil amount. Therefore, during the motor running using a first electric motor and a second electric motor together as the drive force source for running, the reduction in durability of the differential mechanism can be suppressed without a physical countermeasure.

The second aspect of the invention provides the control device of a vehicle recited in the first aspect of the invention, wherein if the rotation speed of the pinion is within a predefined lower rotation range, the requested drive torque is shared by the first electric motor and the second electric motor based on operation efficiency. Consequently, when the rotation speed of the pinion is relatively lower, the durability of the differential mechanism is hardly reduced even if the output torque of the first electric motor is relatively higher and, therefore, the first electric motor and the second electric motor can be operated with the torque of the electric motor shared such that fuel efficiency is prioritized over the improvement in durability.

The third aspect of the invention provides the control device of a vehicle recited in the first or second aspect of the invention, wherein the differential mechanism is a differential mechanism made up of the three rotating elements, wherein a crankshaft of an engine is coupled to the rotating element coupled to the non-rotating member by actuation of the lock mechanism, and wherein during the motor running, the crankshaft is fixed to the non-rotating member. Consequently, the motor running using a first electric motor and a second electric motor together as the drive force source for running is properly performed.

The fourth aspect of the invention provides the control device of a vehicle recited in the first or second aspect of the invention, wherein the differential mechanism is a differential mechanism made up of four rotating elements having the three rotating elements and a rotating element different from the three rotating elements, wherein a crankshaft of an engine is coupled to either the rotating element coupled to the non-rotating member by actuation of the lock mechanism or the different rotating element different from the three rotating elements, and wherein during the motor running, the engine is put into an operation stop state while the drive torque shared by the first electric motor is made further smaller when a rotation speed of the different, rotating element is higher. Consequently, the motor running using a first electric motor and a second electric motor together as the drive force source for running is properly performed. Although the durability of the differential mechanism is easily reduced due to the action of the centrifugal force of the orbital revolution when the rotation speed of the different rotating element is higher i.e. when the orbital revolution speed of the pinion is higher, the output torque of the first electric motor is further reduced, i.e., the output torque of the first electric motor transmitted via the pinion is further reduced even if the orbital revolution speed of the pinion is high and, therefore, the durability of the differential mechanism is further improved.

The fifth aspect of the invention provides the control device of a vehicle recited in any one of the first to fourth aspects of the invention, wherein when a temperature of lubrication oil of the differential mechanism is higher, the drive torque shared by the first electric motor is made further smaller. Consequently, although the durability of the differential mechanism is easily reduced because the lubrication oil easily flows, i.e., an oil film is easily discontinued when the temperature of the lubrication oil is higher, the output torque of the first electric motor is further reduced, i.e., the output torque of the first electric motor transmitted via the pinion is further reduced even if the rotation speed of the pinion is high and, therefore, the durability of the differential mechanism is further improved.

MODE FOR CARRYING OUT THE INVENTION

In the present invention, preferably, the vehicle may be an electric automobile including a first electric motor and a second electric motor as a drive force source for running, a hybrid vehicle including an engine, the first electric motor, and the second electric motor and capable of running with the electric motors, and a so-called plug-in hybrid vehicle that is the hybrid vehicle having an electric storage device chargeable from a charging stand, a household power source, etc. Particularly, since the plug-in hybrid vehicle is considered to have a maximum input/output allowable value of the electric storage device made larger than the hybrid vehicle, the motor running can be performed in a range covering a higher request drive torque, for example. In this case, the electric motors can be restrained from increasing in size by employing the lock mechanism so that the first electric motor and the second electric motor can be used as the drive force source for running rather than making the second electric motor larger, for example. Therefore, the lock mechanism is more useful for the plug-in hybrid vehicle. The present invention is applicable to a vehicle employing the lock mechanism.

An example of the present invention will now be described in detail with reference to the drawings.

First Example

Figure 1:
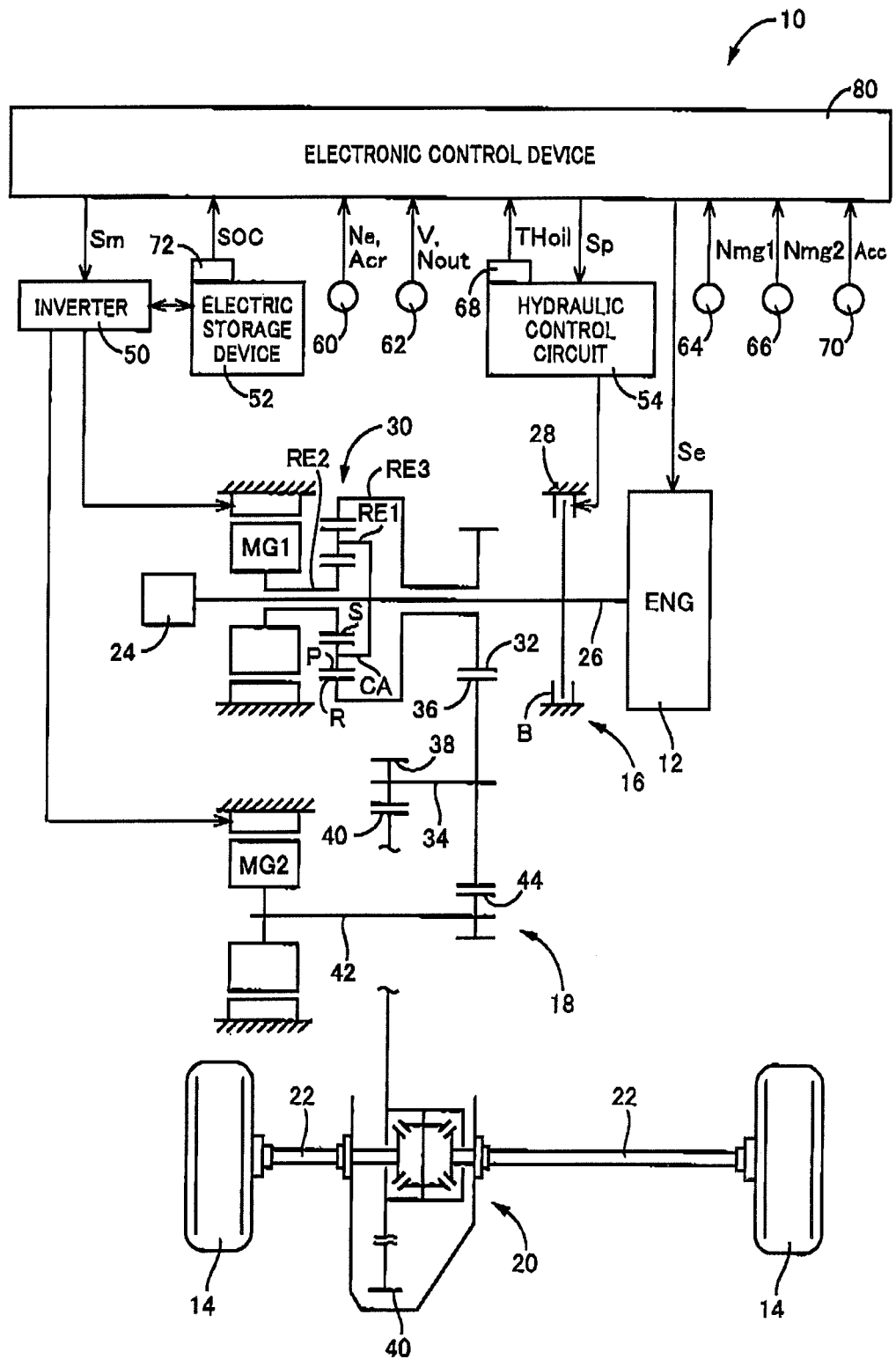
FIG. 1 is a diagram for explaining a general configuration of a vehicle to which the present invention is applied, and is a block diagram for explaining a main portion of a control system disposed on the vehicle.

FIG. 1 is a diagram for explaining a general configuration of a hybrid vehicle 10 (hereinafter referred to as a vehicle 10) to which the present invention is applied, and is a block diagram for explaining a main portion of a control system disposed for controlling portions of the vehicle 10. In FIG. 1, the vehicle 10 includes a first drive portion 16, a second drive portion 18, a differential gear device 20, and a pair of left and right axles 22 disposed on a power transmission path between a drive force source for running, i.e., an engine 12, a first electric motor MG1, and a second electric motor MG2, and a pair of left and right drive wheels 14. The vehicle 10 also includes an oil pump 24 rotationally driven by the engine 12 to generate an oil pressure used as an original oil pressure of a hydraulic control circuit 54 and to supply lubrication oil to the first drive portion 16, the second drive portion 18, etc. The vehicle 10 also includes a brake B as a lock mechanism fixing a crankshaft 26 of the engine 12 to a housing 28 that is a non-rotating member.

The first drive portion 16 includes a planetary gear device 30 and an output gear 32. The planetary gear device 30 is a known single pinion type planetary gear device having a sun gear S that is a rotating element coupled to the first electric motor MG1, a ring gear R that is a rotating element coupled to the drive wheels 14 in a power transmittable manner and that is meshed with the sun gear S via a pinion gear P, and a carrier CA that is a rotating element coupled to the housing 28 by engagement actuation of the brake B and that supports the pinion gear P in a rotatable and revolvable manner, as three rotating elements (rotating members), and acts as a differential mechanism generating a differential action. The carrier CA is coupled to the crankshaft 26 acting as an input shaft of the first drive portion 16 and the ring gear R is coupled to the output gear 32. Therefore, the planetary gear device 30 is a power distribution mechanism including the carrier CA acting as a first rotating element RE1 that is an input rotating member and that is coupled to the engine 12, the sun gear S acting as a second rotating element 11E2, and the ring gear R acting as a third rotating element RE3 that is an output rotating member, so as to distribute power output from the engine 12 to the first electric motor MG1 and the output gear 32, and acts as an electric continuously variable transmission. The output gear 32 is meshed with a large diameter gear 36 disposed integrally with an intermediate output shaft 34 parallel to the crankshaft 26. A small diameter gear 38 disposed integrally with the intermediate output shaft 34 is meshed with a differential input gear 40 of the differential gear device 20.

The second drive portion 18 includes a second output gear 44 coupled to an MG2 output shaft 42 that is an output shaft of the second electric motor MG2. The second output gear 44 is meshed with the large diameter gear 36. As a result, the second electric motor MG2 is coupled to the drive wheels 14 in a power transmittable manner.

Although both the first electric motor MG1 and the second electric motor MG2 are motor generators having a function of a motor generating a drive force and a function of a generator (electric generator) generating a reaction force, the first electric motor MG1 at least has the function of a generator and the second electric motor MG2 at least has the function of a motor.

In the vehicle 10 configured as described above, power from the engine 12 and the first electric motor MG1 in the first drive portion 16 is transmitted via the planetary gear device 30 to the output gear 32 and is transmitted via the large diameter gear 36 and the small diameter gear 38 disposed on the intermediate output shaft 34 to the differential input gear 40 of the differential gear device 20. Power from the second electric motor MG2 in the second drive portion 18 is transmitted via the MG2 output shaft 42 and the second output gear 44 to the large diameter gear 36 and is transmitted via the small diameter gear 38 to the differential input gear 40. Therefore, any of the engine 12, the first electric motor MG1, and the second electric motor MG2 may be used as the drive force source for running in the vehicle 10.

The brake B is a multi-plate type hydraulic friction engagement device subjected to engagement control by a hydraulic actuator, for example. The brake B has an engagement state thereof controlled between engagement and release depending on an oil pressure Pb supplied from the hydraulic control circuit 54. The brake B may be slip-engaged as needed. During release of the brake B, the crankshaft 26 of the engine 12 is made rotatable relative to the housing 28. On the other hand, during engagement of the brake B, the crankshaft 26 is made non-rotatable relative to the housing 28. Therefore, the crankshaft 26 is fixed (locked) to the housing 28 by the engagement of the brake B.

The vehicle 10 includes an electronic control device 80 as a control device controlling the portions of the vehicle 10. The electronic control device 80 includes a so-called microcomputer including a CPU, a RAM, a ROM, and an I/O interface, for example, and the CPU executes signal processes in accordance with programs stored in advance in the ROM, while utilizing a temporary storage function of the RAM, to provide various controls of the vehicle 10. For example, the electronic control device 80 provides vehicle control such as hybrid drive control related to the engine 12, the first electric motor MG1, and the second electric motor MG2 and is configured separately for output control of the engine 12 and output control of the electric motors MG1 and MG2 as needed. The electronic control device 80 is supplied with various signals (e.g., an engine rotation speed Ne and crank angle Acr, an output rotation speed Nout that is a rotation speed of the output gear 32 corresponding to a vehicle speed V, a first electric motor rotation speed Nmg1, a second electric motor rotation speed Nmg2, a lubrication oil temperature THoil that is temperature of lubrication oil of the first drive portion 16 etc., an accelerator opening degree Acc, and a state of charge (charging capacity) SOC of an electric storage device 52) based on detection values from sensors (e.g., a crank position sensor 60, an output rotation speed sensor 62, a first electric motor rotation speed sensor 64 such as a resolver, a second electric motor rotation speed sensor 66 such as a resolver, an oil temperature sensor 68, an accelerator opening degree sensor 70, and a battery sensor 72) disposed on the vehicle 10. The electronic control device 80 supplies various command signals (e.g., an engine control command signal Se, an electric motor control command signal Sm, and a hydraulic control command signal Sp) to devices (e.g., the engine 12, an inverter 50, and the hydraulic control circuit 54) disposed on the vehicle 10.

Figure 2:
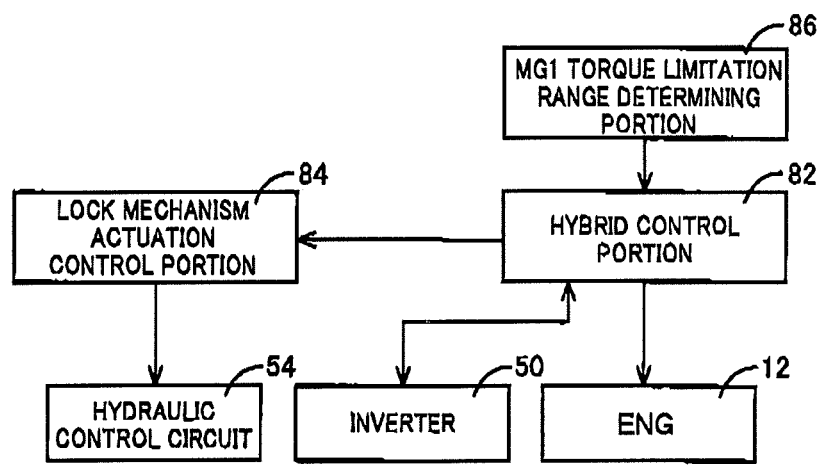
FIG. 2 is a function block diagram for explaining a main portion of a control function of an electronic control device.

FIG. 2 is a function block diagram for explaining a main portion of the control function of the electronic control device 80. In FIG. 2, a hybrid control means, i.e., a hybrid control portion 82 outputs the engine control command signal Se controlling opening/closing of an electronic throttle valve, a fuel injection amount, and ignition timing, for example, and provides the output control of the engine 12 so as to acquire a target value of an engine torque Te for generating a target engine power Pe*. The hybrid control portion 82 outputs to the inverter 50 the electric motor control command signal Sm controlling operations of the first electric motor MG1 and the second electric motor MG2 and provides the output control of the first electric motor MG1 and the second electric motor MG2 so as to acquire target values of a first electric motor torque Tmg1 and a second electric motor torque Tmg2.

Specifically, the hybrid control portion 82 calculates a drive torque (request drive torque) requested at the vehicle speed V at a certain time point from the accelerator opening degree Acc and generates the request drive torque from at least one of the engine 12, the first electric motor MG1, and the second electric motor MG2 so as to achieve operation with lower fuel consumption and a smaller exhaust gas amount in consideration of a charging request value (charging request power) etc. For example, the hybrid control portion 82 selectively establishes depending on a running state a motor running mode for motor running (EV running) using at least only one electric motor of the first electric motor MG1 and the second electric motor MG2 as the drive force source for running with operation of the engine 12 stopped, an engine running mode (steady running mode) for engine running using at least the engine 12 as the drive force source for running by accepting a reaction force against the power of the engine 12 with electric generation of the first electric motor MG1 to transmit an engine direct torque to the output gear 32 while the second electric motor MG2 is driven by generated electric power of the first electric motor MG1 to transmit a torque to the drive wheels 14, and an assist running mode (acceleration running mode) for running with a drive torque of the second electric motor MG2 using electric power from the electric storage device 52 further added in the engine running mode. The hybrid control portion 82 establishes the motor running mode in the case of a motor running range in which the request drive torque is smaller than a threshold value obtained and stored empirically or in design in advance (i.e., predefined), and establishes the engine running mode or the assist running mode in the case of an engine running range in which the request drive torque is equal to or greater than the predefined threshold value.

If the motor running mode is established, the hybrid control portion 82 further determines whether the mode is set to a combination mode in which the first electric motor torque Tmg1 and the second electric motor torque Tmg2 can be used together for running or a single mode in which only the second electric motor torque Tmg2 can be used for running. For example, in the motor running mode, the hybrid control portion 82 establishes the single mode if the request drive torque can be achieved solely by the second electric motor MG2, and establishes the combination mode if the request drive torque cannot be achieved solely by the second electric motor MG2. However, even when the request drive torque can be achieved solely by the second electric motor MG2, if an operating point of the second electric motor MG2 (e.g., an operation point of the second electric motor represented by the second electric motor rotation speed Nmg2 and the second electric motor torque Tmg2) is within a range predefined as operating points deteriorating efficiency of the second electric motor MG2, or in other words, if higher efficiency is acquired by using the first electric motor MG1 and the second electric motor MG2 together, the hybrid control portion 82 establishes the combination mode.

If the combination mode is established in the motor running mode, the hybrid control portion 82 causes the first electric motor MG1 and the second electric motor MG2 to share the request drive torque based on operation efficiency of the first electric motor MG1 and the second electric motor MG2. For example, during the motor running in the combination mode, the hybrid control portion 82 obtains a fuel efficiency oriented torque sharing rate predefined based on the request drive torque and obtains respective sharing torques of the first electric motor MG1 and the second electric motor MG2 for the request drive torque based on the sharing rate. The hybrid control portion 82 controls the first electric motor MG1 and the second electric motor MG2 to output the sharing torques so that the motor running is performed.

A lock mechanism actuation control means, i.e., a lock mechanism actuation control portion 84 controls the actuation of the brake B. Specifically, the lock mechanism actuation control portion 84 controls the oil pressure Pb supplied from the hydraulic control circuit 54 to the hydraulic actuator of the brake B to control the engagement or release of the brake B, i.e., fixation, or release of fixation, of the crankshaft 26 to the housing 28. For example, if the hybrid control portion 82 establishes the combination mode in the motor running mode, the lock mechanism actuation control portion 84 increases the oil pressure Pb to engage the brake B, thereby fixing the crankshaft 26 to the housing 28. If the hybrid control portion 82 establishes the engine running mode or the assist running mode or establishes the single mode in the motor running mode, the lock mechanism actuation control portion 84 reduces the oil pressure Pb to release the brake B, thereby releasing the fixation of the crankshaft 26 to the housing 28.

Figure 3:
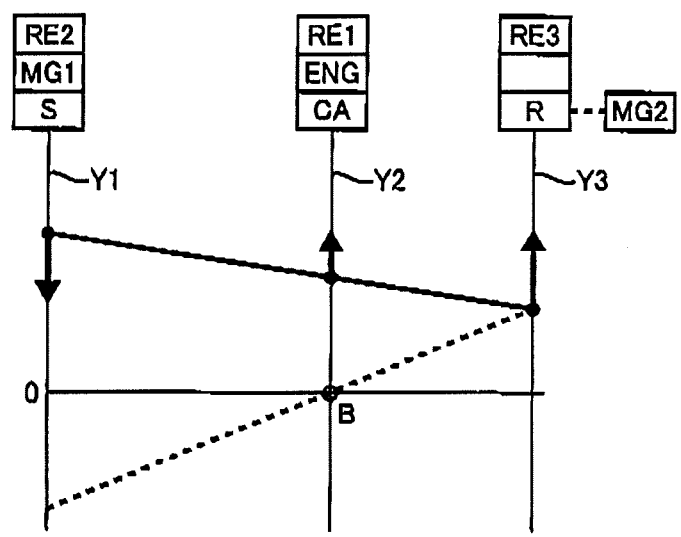
FIG. 3 is a collinear diagram capable of relatively representing rotation speeds of rotating elements in a planetary gear device and indicates a running state when a brake is released.
Figure 4:
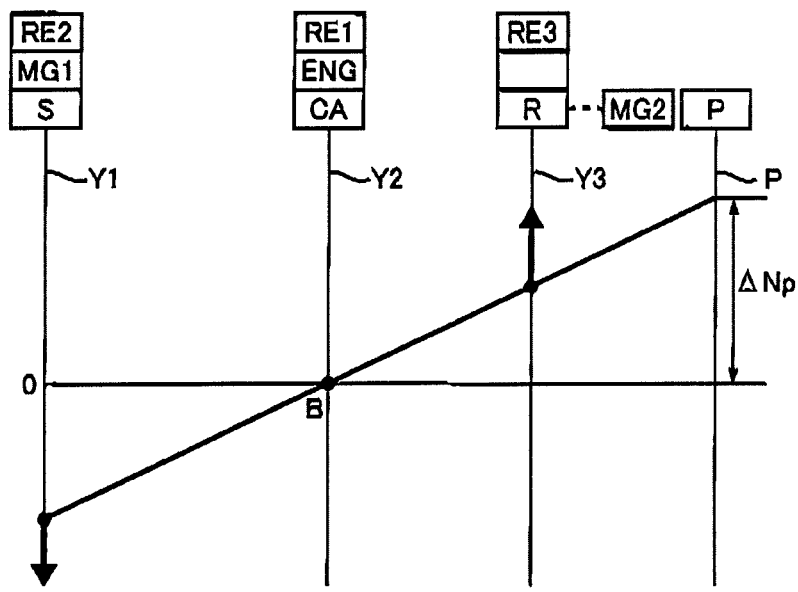
FIG. 4 is the same collinear diagram as FIG. 3 and indicates a running state when a brake is engaged.

FIGS. 3 and 4 are collinear diagrams capable of relatively representing rotation speeds of the three rotating elements in the planetary gear device 30 and, with regard to vertical lines Y1 to Y3, from left to right on the planes of FIGS. 3 and 4, the vertical line Y1 indicates the rotation speed of the sun gear S that is the second rotating element RE2 coupled to the first electric motor MG1; the vertical line Y2 indicates the rotation speed of the carrier CA that is the first rotating element RE1 coupled to the engine 12; and the vertical line Y3 indicates the rotation speed of the ring gear R that is the third rotating element RE3 coupled to the second electric motor MG2 via the large diameter gear 36, the second output gear 44, etc. FIG. 3 represents relative speeds of the rotating elements in a running state when the brake B is released and FIG. 4 represents relative speeds of the rotating elements in a running state when the brake B is engaged.

Describing operation of the vehicle 10 in the engine running mode or the assist running mode by using a solid line of FIG. 3, the first electric motor torque Tmg1 is input to the sun gear S for the engine torque Te input to the carrier CA. In this case, for example, control of setting an operation point of the engine 12 represented by the engine rotation speed Ne and the engine torque Te to an operating point with the best fuel efficiency can be provided through power running control or reaction force control of the first electric motor MG1. This kind of hybrid format is referred to as a mechanical distribution type or a split type. Describing the operation of the vehicle 10 in the single mode in the motor running mode by using a broken line of FIG. 3, drive of the engine 12 is not performed (i.e., the engine 12 is put into an operation stop state) and rotation speed thereof is set to zero. In this state, power running torque of the second electric motor MG2 is transmitted as a drive force in the vehicle forward direction to the drive wheels 14. The first electric motor MG1 is put into a no-load state (made free).

Describing the operation of the vehicle 10 in the combination mode in the motor running mode with reference to FIG. 4, the drive of the engine 12 is not performed and the rotation speed thereof is set to zero. The brake B is actuated for engagement by the lock mechanism actuation control portion 84 to fix the crankshaft 26 to the housing 28 and the engine 12 is fixed (locked) to be non-rotatable. In the engaged state of the brake B, the power running torque of the second electric motor MG2 is transmitted as a drive force in the vehicle forward direction to the drive wheels 14. Reaction torque of the first electric motor MG1 is transmitted as a drive force in the vehicle forward direction to the drive wheels 14. Therefore, when the crankshaft 26 is locked by the brake B, the vehicle 10 can use the first electric motor MG1 and the second electric motor MG2 together as the drive force source for running. As a result, for example, if the electric storage device 52 is increased in capacity (increased in output power) in a so-called plug-in hybrid vehicle etc., higher output of the motor running can be realized while the second electric motor MG2 is restrained from increasing in size.

In the vehicle 10 of this example, if the first electric motor MG1 and the second electric motor MG2 are used together as the drive force source for running in the combination mode in the motor running mode, power of the second electric motor MG2 is transmitted to the drive wheels 14 without via the planetary gear device 30. On the other hand, power of the first electric motor MG1 is transmitted from the ring gear R via the planetary gear device 30 (particularly, the pinion gear P making up the planetary gear device 30) to the drive wheels 14. In FIG. 4, a vertical line P indicates an axial rotation speed Np of the pinion gear P on the collinear diagram. As apparent from FIG. 4, when the brake B is engaged, if the rotation speed of the ring gear R increases, the axial rotation speed Np of the pinion gear P increases because of a relationship of relative speeds of the rotating elements of the planetary gear device 30 including the pinion gear P. This leads to an increase in a relative rotation speed (differential rotation speed) $\Delta Np$ (=Np−Ne) of the pinion gear P represented by a rotation speed difference between the axial rotation speed Np of the pinion gear P and the rotation speed of the carrier CA (i.e., the engine rotation speed Ne). Therefore, if the differential rotation speed (pinion differential rotation speed) $\Delta Np$ of the pinion gear P increases due to an increase in the rotation speed (output rotation speed Nout) of the ring gear R corresponding to the vehicle speed V, the durability of the planetary gear device 30 (particularly, a bearing etc. of the pinion gear P) may be more reduced as a larger first electric motor torque Tmg1 is transmitted. Although it is contemplated that a physical countermeasure such as increasing an amount of lubrication oil to the planetary gear device 30 is taken for transmitting the larger first electric motor torque Tmg1 against such a reduction in durability, this may deteriorate fuel efficiency.

Therefore, during the motor running using the first electric motor MG1 and the second electric motor MG2 together as the drive force source for running while the brake B is actuated for engagement in the motor running mode, the electronic control device 80 of this example makes a drive torque shared by the first electric motor MG1 smaller in the request drive torque when the rotation speed of the pinion gear P is higher so as to suppress reduction in durability of the planetary gear device 30 without taking a physical countermeasure. The rotation speed of the pinion gear P is, for example, the axial rotation speed Np of the pinion gear P and the pinion differential rotation speed $\Delta Np$. While the brake B is actuated for engagement, the rotation speed of the carrier CA is zero and, therefore, the axial rotation speed Np of the pinion gear P is substantially the same as the pinion differential rotation speed $\Delta Np$.

Figure 5:
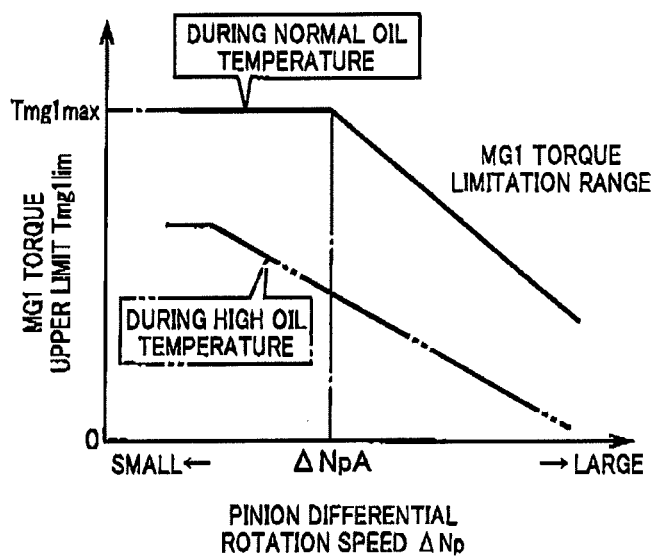
FIG. 5 depicts an example of a MG1 torque upper limit map.

FIG. 5 depicts a predefined relationship (MG1 torque upper limit map) between the pinion differential rotation speed $\Delta Np$ and an upper limit torque (MG1 torque upper limit) Tmg1lim of the first electric motor torque Tmg1 that can be defined as the sharing torque of the first electric motor MG1. With regard to a solid line of FIG. 5, in a lower rotation range with the pinion differential rotation speed $\Delta Np$ equal to or less than a predetermined value $\Delta NpA$, the MG1 torque upper limit Tmg1lim is set to a maximum value (MG1 torque maximum value) Tmg1max that can be output by the first electric motor MG1. Therefore, in the lower rotation range with the pinion differential rotation speed $\Delta Np$ equal to or less than the predetermined value $\Delta NpA$, the sharing torque of the first electric motor MG1 for the request drive torque obtained at the fuel efficiency oriented torque sharing rate can be output. With regard to the solid line of FIG. 5, in a higher rotation range with the pinion differential rotation speed $\Delta Np$ exceeding the predetermined value $\Delta NpA$, the MG1 torque upper limit Tmg1lim is made smaller when the pinion differential rotation speed $\Delta Np$ is larger. Therefore, in the higher rotation range with the pinion differential rotation speed $\Delta Np$ exceeding the predetermined value $\Delta NpA$, the sharing torque of the first electric motor MG1 for the request drive torque obtained at the fuel efficiency oriented torque sharing rate can only be output up to the MG1 torque upper limit Tmg1lim. In other words, when the pinion differential rotation speed $\Delta Np$ is larger, the sharing torque of the first electric motor MG1 is made smaller. The range with the MG1 torque upper limit Tmg1lim not set to the MG1 torque maximum value Tmg1max is defined as an MG1 torque limitation range, and the higher rotation range with the pinion differential rotation speed $\Delta Np$ exceeding the predetermined value $\Delta NpA$ corresponds to the MG1 torque limitation range. The predetermined value $\Delta NpA$ is an upper limit value predefined as the pinion differential rotation speed $\Delta Np$ hardly causing the problem of reduction in durability of the bearing etc. of the pinion gear P even if the first electric motor torque Tmg1 is not limited (even if the first electric motor torque Tmg1 is set to the MG1 torque maximum value Tmg1max) during the combination mode in the motor running mode.

When the lubrication oil temperature THoil is high, the lubrication oil easily flows, i.e., an oil film is easily discontinued and, therefore, it is considered that the durability of the planetary gear device 30 is easily reduced. Therefore, when the lubrication oil temperature THoil is higher, the drive torque shared by the first electric motor MG1 is made further smaller. A dashed-two dotted line of FIG. 5 is the MG1 torque upper limit map during high oil temperature when the lubrication oil temperature THoil is relatively high and indicates the MG1 torque upper limit Tmg1lim made smaller at the pinion differential rotation speed $\Delta Np$ of the same value as compared to the MG1 torque upper limit map indicated by the solid line during normal oil temperature when the lubrication oil temperature THoil is normal. Therefore, during the high oil temperature when the lubrication oil temperature THoil is higher than during the normal oil temperature, the sharing torque of the first electric motor MG1 is made further smaller and the MG1 torque limitation range is defined over the entire range of the pinion differential rotation speed $\Delta Np$. When it is during the normal oil temperature, this means that the lubrication oil temperature THoil is within a predetermined lower oil temperature range predefined as the lubrication oil temperature THoil hardly causing the problem that the durability of the planetary gear device 30 is easily reduced, for example. When it is during the high oil temperature, this means that the lubrication oil temperature THoil is within a higher oil temperature range higher than the predetermined lower oil temperature range.

More specifically, returning to FIG. 2, if the hybrid control portion 82 establishes the combination mode in the motor running mode, an MG1 torque limitation range determining means, i.e., an MG1 torque limitation range determining portion 86 determines whether the vehicle is within the MG1 torque limitation range. For example, the MG1 torque limitation range determining portion 86 determines whether the vehicle is within the MG1 torque limitation range based on whether it is during the high oil temperature. If it is determined that it is during the normal oil temperature, the MG1 torque limitation range determining portion 86 determines whether the vehicle is within the MG1 torque limitation range based on whether the pinion differential rotation speed $\Delta Np$ exceeds the predetermined value $\Delta NpA$. The pinion differential rotation speed $\Delta Np$ is obtained by the electronic control device 80 based on the axial rotation speed Np of the pinion gear P and the rotation speed of the carrier CA obtained based on at least two rotating elements from the relationship of relative speeds of the rotating elements of the planetary gear device 30, for example.

If the MG1 torque limitation range determining portion 86 determines that the vehicle is not within the MG1 torque limitation range during the combination mode in the motor running mode (e.g., in the case of the lower rotation range with the pinion differential rotation speed ΔNp equal to or less than the predetermined value ΔNpA during the normal oil temperature), the hybrid control portion 82 causes the first electric motor MG1 and the second electric motor MG2 to share the request drive torque based on a predefined fuel efficiency oriented torque sharing rate. On the other hand, if the MG1 torque limitation range determining portion 86 determines that the vehicle is within the MG1 torque limitation range during the combination mode in the motor running mode, the hybrid control portion 82 obtains the MG1 torque upper limit Tmg1lim based on the pinion differential rotation speed ΔNp and the lubrication oil temperature THoil from the MG1 torque upper limit map as depicted in FIG. 5, for example. If the sharing torque of the first electric motor MG1 based on the predefined fuel efficiency oriented torque sharing rate exceeds the MG1 torque upper limit Tmg1lim, the hybrid control portion 82 limits the sharing torque of the first electric motor MG1 to the MG1 torque upper limit Tmg1lim. In this case, the hybrid control portion 82 assigns to the second electric motor MG2 an exceeding portion of the sharing torque of the first electric motor MG1 relative to the MG1 torque upper limit Tmg1lim as much as possible. Therefore, in this case, the priority of fuel efficiency is reduced. An actual drive torque becomes insufficient for the request drive torque due to a portion that cannot be assigned to the second electric motor MG2. If the sharing torque of the first electric motor MG1 based on the predefined fuel efficiency oriented torque sharing rate does not exceed the MG1 torque upper limit Tmg1lim, it is obvious that the first electric motor torque Tmg1 is not substantially limited even when the vehicle is within the MG1 torque limitation range.

Figure 6:
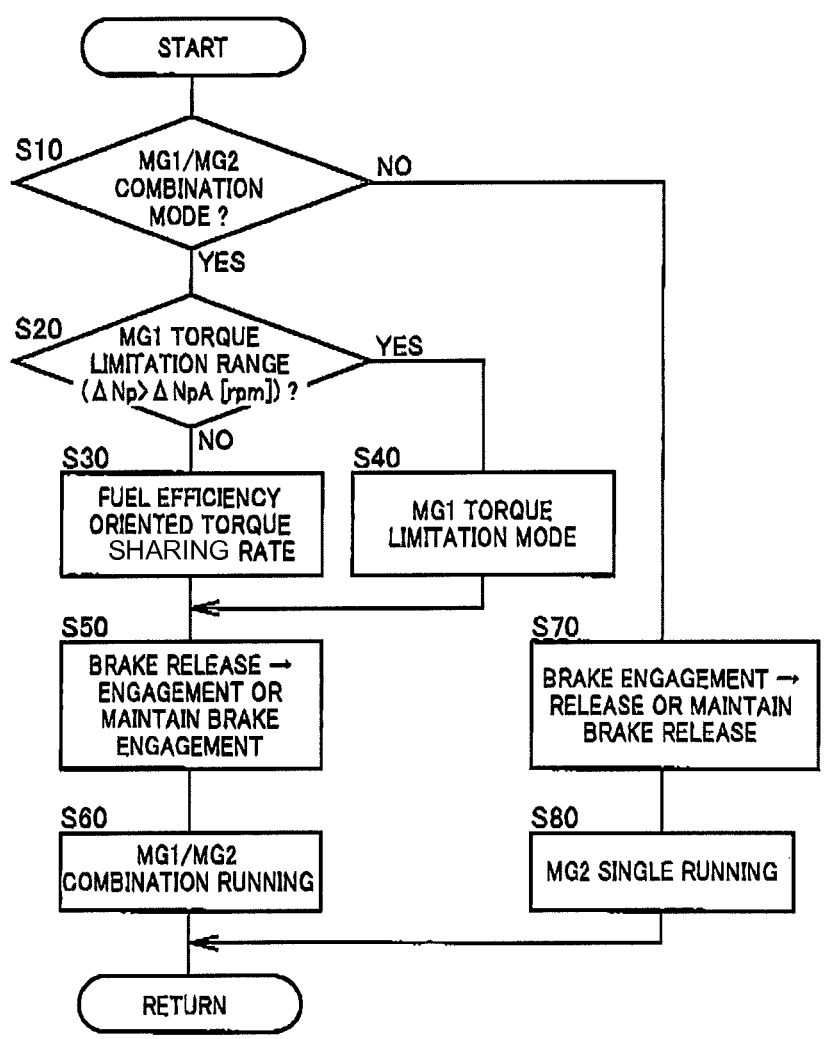
FIG. 6 is a flowchart for explaining a main portion of control operation of the electronic control device, i.e., control operation for suppressing reduction in durability of the planetary gear device without taking a physical countermeasure during motor running in a combination mode.
Figure 7:
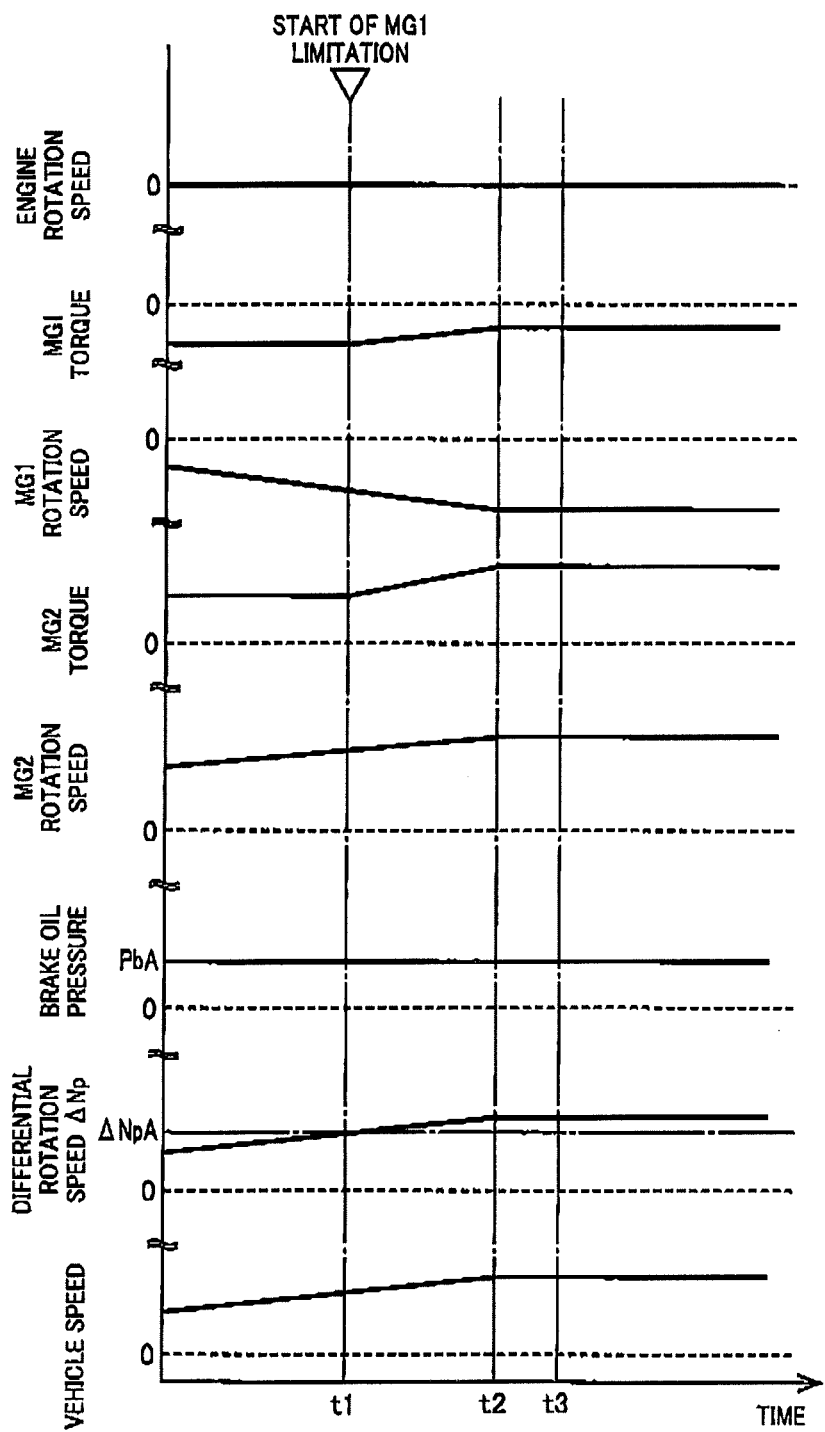
FIG. 7 is a time chart when the control operation depicted in the flowchart of FIG. 6 is executed.

FIG. 6 is a flowchart for explaining a main portion of the control operation of the electronic control device 80, i.e., the control operation for suppressing the reduction in durability of the planetary gear device 30 without taking a physical countermeasure during the motor running in the combination mode, and is repeatedly executed with an extremely short cycle time, for example, on the order of a few msec to a few tens of msec. FIG. 7 is a time chart when the control operation depicted in the flowchart of FIG. 6 is executed and depicts an example when the pinion differential rotation speed ΔNp rises as the vehicle speed V increases during the motor running in the combination mode.

In FIG. 6, first, at step (hereinafter, step will be omitted) S10 corresponding to the hybrid control portion 82, it is determined whether the vehicle is within the range of running with the first electric motor torque Tmg1 and the second electric motor torque Tmg2 used together when the motor running mode is established, for example. If the determination of S10 is affirmative, at S20 corresponding to the MG1 torque limitation range determining portion 86, it is determined whether the vehicle is within the MG1 torque limitation range based on whether it is during the high oil temperature, for example. During the normal oil temperature, it is determined whether the vehicle is within the MG1 torque limitation range based on whether the pinion differential rotation speed ΔNp exceeds the predetermined value ΔNpA (see the example of FIG. 7). If the determination of S20 is negative, at S30 corresponding to the hybrid control portion 82, the fuel efficiency oriented torque sharing rate predefined based on the request drive torque is obtained, and the respective sharing torques of the first electric motor MG1 and the second electric motor MG2 are obtained for the request drive torque based on the sharing rate (before time t1 of FIG. 7). On the other hand, if the determination of S20 is affirmative, at S40 corresponding to the hybrid control portion 82, the MG1 torque upper limit Tmg1lim is obtained based on the pinion differential rotation speed ΔNp and the lubrication oil temperature THoil from the MG1 torque upper limit map as depicted in FIG. 5, for example. As is the case with S30, the respective sharing torques of the first electric motor MG1 and the second electric motor MG2 are obtained for the request drive torque based on the predefined fuel efficiency oriented torque sharing rate. If the sharing torque of the first electric motor MG1 exceeds the MG1 torque upper limit Tmg1lim, the sharing torque of the first electric motor MG1 is limited to the MG1 torque upper limit Tmg1lim (after time t1 of FIG. 7). If the first electric motor torque Tmg1 comes short because of the limitation of the sharing torque of the first electric motor MG1, the shortage of the first electric motor torque Tmg1 is added to the sharing torque of the second electric motor MG2 as much as possible (after time t1 of FIG. 7). Following S30 or S40, at S50 corresponding to the lock mechanism actuation control portion 84, the brake B is engaged or the engagement of the brake B is maintained (see the example of FIG. 7). At S60 corresponding to the hybrid control portion 82, the motor running in the combination mode is performed with the sharing torques of the first electric motor MG1 and the second electric motor MG2 obtained at S30 or S40 (see the example of FIG. 7). On the other hand, if the determination of S10 is negative, at S70 corresponding to the lock mechanism actuation control portion 84, the brake B is released or the release of the brake B is maintained. At S80 corresponding to the hybrid control portion 82, the request drive torque is output only by the second electric motor MG2 to perform the motor running in the single mode.

As described above, according to this example, during the motor running in the combination mode with the brake B engaged, the drive torque shared by the first electric motor MG1 is made smaller in the request drive torque when the rotation speed of the pinion gear P is higher. As a result, since the first electric motor torque Tmg1 is reduced when the pinion differential rotation speed ΔNp is higher, i.e., since the first electric motor torque Tmg1 transmitted via the pinion gear P is reduced even when the pinion differential rotation speed ΔNp is higher, the durability of the planetary gear device 30 (e.g., seizure resistance of the bearing of the pinion gear P) is improved. This eliminates the need for providing a special lubrication path or increasing a lubrication oil amount. Therefore, during the motor running in the combination mode, the reduction in durability of the planetary gear device 30 can be suppressed without taking a physical countermeasure.

According to this example, in the case of the lower rotation range with the pinion differential rotation speed ΔNp equal to or less than the predetermined value ΔNpA, the request drive torque is shared by the first electric motor MG1 and the second electric motor MG2 based on operation efficiency. As a result, when the pinion differential rotation speed ΔNp is relatively lower, the durability of the planetary gear device 30 is hardly reduced even if the first electric motor torque Tmg1 is relatively higher and, therefore, the first electric motor MG1 and the second electric motor MG2 can be operated with the torque shared such that fuel efficiency is prioritized over the improvement in durability.

According to this example, since the planetary gear device 30 is a planetary gear device made up of three rotating elements and the crankshaft 12 is fixed to the housing 28 by the engagement actuation of the brake B during the motor running in the combination mode, the motor running in the combination mode is properly performed.

According to this example, when the lubrication oil temperature THoil is higher, the request drive torque shared by the first electric motor MG1 is made further smaller. As a result, although the durability of the planetary gear device 30 is easily reduced because the lubrication oil easily flows, i.e., an oil film is easily discontinued when the lubrication oil temperature THoil is higher, the first electric motor torque Tmg1 is further reduced, i.e., the first electric motor torque Tmg1 transmitted via the pinion gear P is further reduced even if the pinion differential rotation speed ΔNp is high and, therefore, the durability of the planetary gear device 30 is further improved.

Another example of the present invention will be described. In the following description, the portions mutually common to the examples are denoted by the same reference numerals and will not be described.

Second Example

Figure 8:
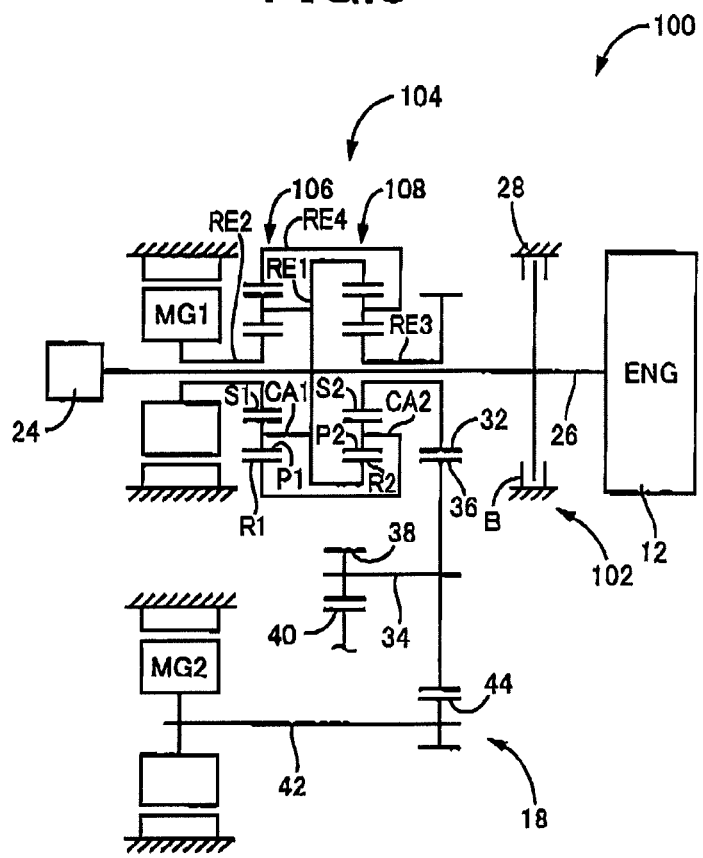
FIG. 8 is a diagram depicting an example of a first drive portion including a differential mechanism made up of four rotating elements and is an example different from a first drive portion of FIG. 1.

FIG. 8 is a diagram for explaining a general configuration of a hybrid vehicle 100 (hereinafter referred to as a vehicle 100) that is another vehicle to which the present invention is applied. A first drive portion 102 of the vehicle 100 depicted in FIG. 8 includes a differential mechanism 104 made up of four rotating elements.

The differential mechanism 104 includes a single pinion type first planetary gear device 106 having a first sun gear S1, a first carrier CA1, and a first ring gear R1 meshed with the first sun gear S1 via a first pinion gear P1, and a single pinion type second planetary gear device 108 having a second sun gear S2, a second carrier CA2, and a second ring gear R2 meshed with the second sun gear S2 via a second pinion gear P2. The differential mechanism 104 acts as a differential mechanism having four rotating elements, i.e., a first rotating element RE1 configured by coupling the first carrier CA1 and the second ring gear R2, a second rotating element RE2 made up of the first sun gear S1, a third rotating element RE3 made up of the second sun gear S2, and a fourth rotating element RE4 configured by coupling the first ring gear R1 and the second carrier CA2, to generate a differential action as a whole. Therefore, the differential mechanism 104 is made up of four rotating elements having the second rotating element RE2 coupled to the first electric motor MG1, the third rotating element RE3 coupled to the drive wheels 14 in a power transmittable manner, and the first rotating element RE1 coupled to the housing 28 by the engagement actuation of the brake B as well as the fourth rotating element RE4 other than these three rotating elements. The differential mechanism 104 has the first rotating element RE1 acting as an input rotating member coupled to the crankshaft 26 of the engine 12 and the third rotating element RE3 acting as an output rotating member coupled to the output gear 32. The differential mechanism 104 configured as described above is a power distribution mechanism distributing the power output from the engine 12 to the first electric motor MG1 and the output gear 32 and acts as an electric continuously variable transmission.

Figure 9:
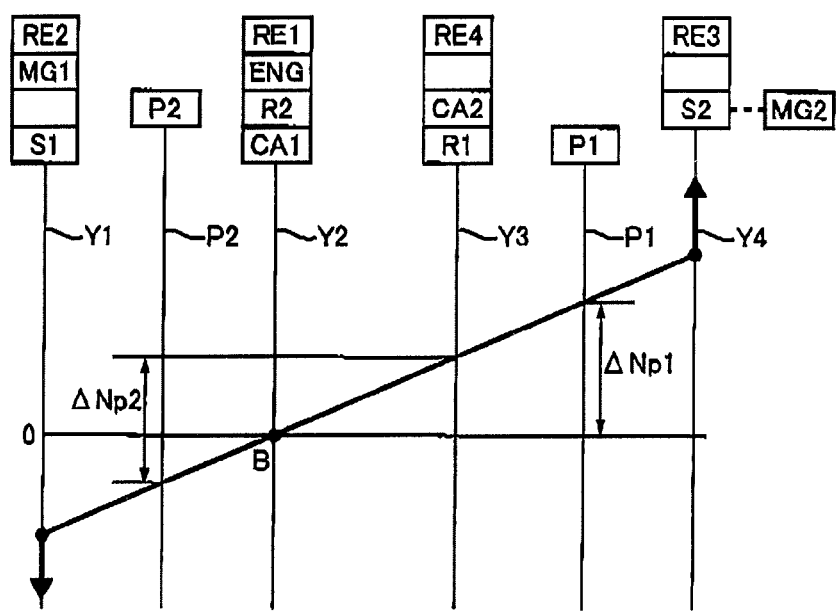
FIG. 9 is a collinear diagram in the differential mechanism of FIG. 8 and indicates a running state when a brake is engaged.

FIG. 9 is a collinear diagram capable of relatively representing rotation speeds of the four rotating elements in the differential mechanism 104 and, with regard to vertical lines Y1 to Y4, from left to right on the plane of FIG. 9, the vertical line Y1 indicates the rotation speed of the second rotating element RE2; the vertical line Y2 indicates the rotation speed of the first rotating element RE1; the vertical line Y3 indicates the rotation speed of the fourth rotating element RE4; and the vertical line Y4 indicates the rotation speed of the third rotating element RE3. FIG. 9 represents relative speeds of the rotating elements in a running state when the brake B is engaged.

Describing operation of the vehicle 100 in the combination mode in the motor running mode with reference to FIG. 9, the engine 12 is put into the operation stop state and the rotation speed thereof is set to zero. The brake B is actuated for engagement to fix the crankshaft 26 to the housing 28 by the lock mechanism actuation control portion 84 through the hydraulic control circuit 54 and the rotation of the engine 12 is locked. In the engaged state of the brake B, the power running torque of the second electric motor MG2 is transmitted as a drive force in the vehicle forward direction to the drive wheels 14. The reaction torque of the first electric motor MG1 is transmitted as a drive force in the vehicle forward direction to the drive wheels 14. Therefore, when the crankshaft 26 of the engine 12 is locked by the brake B, the vehicle 100 can use the first electric motor MG1 and the second electric motor MG2 together as the drive force source for running.

In FIG. 9, vertical lines P1 and P2 indicate axial rotation speeds Np1 and Np2 of the pinion gears P1 and P2 on the collinear diagram. As apparent from FIG. 9, when the brake B is engaged, if the rotation speed of the third rotating element RE3 increases, differential rotation speeds ΔNp1 and ΔNp2 of the pinion gears P1 and P2 increase. If the rotation speed of the third rotating element RE3 increases, the rotation speed of the fourth rotating element RE4 also increases. The rotation speed of the fourth rotating element RE4, i.e., the rotation speed of the second carrier CA2 is an orbital revolution speed of the pinion gear P2. Therefore, when the orbital revolution speed of the pinion gear P2 increases, the differential rotation speed ΔNp2 of the pinion gear P2 obviously increases and the durability of the differential mechanism 104 (particularly, a bearing etc. of the pinion gear P2) is considered to be further reduced due to an action of the centrifugal force of the orbital revolution. In other words, even when the differential rotation speed of the pinion gear is the same, if the orbital revolution speed of the pinion gear is included, the durability of the bearing etc. of the pinion gear is considered to be more easily reduced as compared to the case of only the axial rotation speed of the pinion gear.

Figure 10:
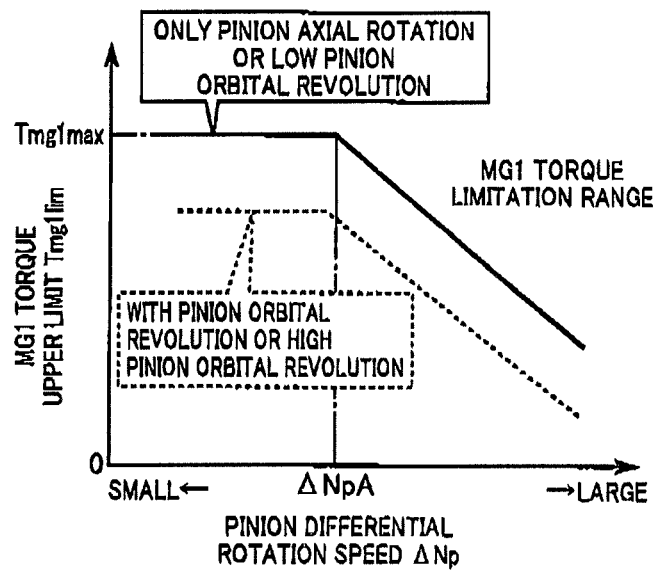
FIG. 10 is a diagram depicting an example of a MG1 torque upper limit map and is an example different from the MG1 torque upper limit map of FIG. 5.

Therefore, during the motor running in the combination mode, the electronic control device 80 of this example makes the drive torque shared by the first electric motor MG1 smaller when the orbital revolution speed of the pinion gear P2 is higher. FIG. 10 depicts a predetermined relationship (MG1 torque upper limit map) between the pinion differential rotation speed ΔNp and the MG1 torque upper limit Tmg1lim. A solid line of FIG. 10 is the MG1 torque upper limit map during the normal oil temperature as is the case with the solid line of FIG. 5 and is the MG1 torque upper limit map used when the pinion gear only rotates without orbital revolution as in the case of the first drive portion 16 of FIG. 1 or during low pinion orbital revolution when the orbital revolution speed of the pinion gear P2 is relatively lower. On the other hand, a broken line of FIG. 10 is the MG1 torque upper limit map used when the pinion gear P2 also revolves as in the case of the first drive portion 102 of this example or during high pinion orbital revolution when the orbital revolution speed of the pinion gear P2 is relatively higher, and indicates the MG1 torque upper limit Tmg1lim made smaller at the pinion differential rotation speed ΔNp of the same value as compared to the MG1 torque upper limit map indicated by the solid line. Therefore, when the pinion gear also revolves or when it is during the high pinion orbital revolution, the sharing torque of the first electric motor MG1 is made further smaller as compared to when the pinion gear only rotates or when it is during the low pinion orbital revolution, and the MG1 torque limitation range is defined over the entire range of the pinion differential rotation speed ΔNp. When it is during the low pinion orbital revolution, this means that the orbital revolution speed of the pinion gear P2 is within a predetermined lower orbital revolution speed range predefined as the orbital revolution speed of the pinion gear P2 hardly causing the problem that the durability of the differential mechanism 104 is easily reduced, for example. When it is during the high pinion orbital revolution, this means that the orbital revolution speed of the pinion gear P2 is within a higher orbital revolution speed range higher than the predetermined lower orbital revolution speed range. The MG1 torque upper limits Tmg1lim may respectively be obtained based on the differential rotation speed ΔNp1 of the pinion gear P1 and the differential rotation speed ΔNp2 of the pinion gear P2 to select the smaller MG1 torque upper limit Tmg1lim.

As described above, according to this example, the same effects as the example described above are acquired except an effect specific to the planetary gear device 30 made up of the three rotating elements. Additionally, according to this example, since the differential mechanism 104 is the differential mechanism made up of the four rotating elements and the first rotating element RE1 coupled to the housing 28 by the engagement actuation of the brake B is coupled to the crankshaft 26 of the engine 12 so that the engine 12 is put into the operation stop state during the motor running in the combination mode, the motor running in the combination mode is properly performed. When the orbital revolution speed of the pinion gear P2 is higher, the request drive torque shared by the first electric motor MG1 is made further smaller. As a result, although the durability of the differential mechanism 104 is easily reduced due to the action of the centrifugal force of the orbital revolution when the orbital revolution speed of the pinion gear is higher, the first electric motor torque Tmg1 is further reduced, i.e., the first electric motor torque Tmg1 transmitted via the pinion gear P2 is further reduced even if the orbital revolution speed of the pinion gear P2 is high and, therefore, the durability of the differential mechanism 104 is further improved.

Although the examples of the present invention have been described in detail with reference to the drawings, the present invention is also applied in other forms.

For example, although the two types of the MG1 torque upper limit maps are exemplarily illustrated for during the normal oil temperature and during the high oil temperature as depicted in FIG. 5 in the example, this is not a limitation. For example, a plurality of types of the MG1 torque upper limit maps may be included such that the MG1 torque upper limit Tmg1lim is made smaller as the lubrication oil temperature THoil becomes higher. The maps may not necessarily be included as long as a continuously changing relationship is defined in advance such that the MG1 torque upper limit Tmg1lim is made smaller as the lubrication oil temperature THoil becomes higher. Although the two types of the MG1 torque upper limit maps are exemplarily illustrated for during the low pinion orbital revolution and during the high pinion orbital revolution as depicted in FIG. 10, this is not a limitation. For example, a plurality of types of the MG1 torque upper limit maps may be included such that the MG1 torque upper limit Tmg1lim is made smaller as the orbital revolution speed of the pinion gear P2 becomes higher. The maps may not necessarily be included as long as a continuously changing relationship is defined in advance such that the MG1 torque upper limit Tmg1lim is made smaller as the orbital revolution speed of the pinion gear P2 becomes higher. The MG1 torque upper limit map may be used that indicates the MG1 torque upper limit Tmg1lim made further smaller during the high oil temperature and the high pinion orbital revolution as compared to the MG1 torque upper limit map during the high oil temperature.

Although the MG1 torque upper limit Tmg1lim is obtained based on the differential rotation speed of the pinion gear in the examples, this is not a limitation. For example, the axial rotation speed of the pinion gear may be used for the pinion gear that does not revolve. If the brake B is actuated for engagement, the rotation speed of the pinion gear is proportional to the vehicle speed and, therefore, the vehicle speed may be used instead of the rotation speed of the pinion gear. Specifically, during the motor running in the combination mode, the drive torque shared by the first electric motor MG1 may be made smaller in the request drive torque when the vehicle speed V is higher.

Although the crankshaft 26 of the engine 12 is coupled to the first rotating element RE1 in the differential mechanism 104 in the second example, the present invention is applicable even in a configuration with the crankshaft 26 of the engine 12 coupled to the fourth rotating element RE4. Although the rotation of the engine 12 is not locked even when the brake B is actuated for engagement during the motor running in the combination mode in this case, the engine 12 is put into the operation stop state. The present invention is applicable even in a configuration with the fourth rotating element RE4 coupled to the housing 28 by the engagement actuation of the brake B instead of the first rotating element RE1 in the differential mechanism 104.

Figure 11:
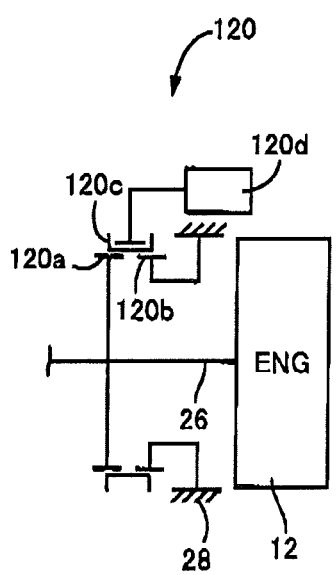
FIG. 11 is a diagram for explaining a general configuration of a meshing clutch as a lock mechanism.

Although the brake B is exemplarily illustrated as the lock mechanism in the examples, this is not a limitation. The lock mechanism may be, for example, a one-way clutch allowing rotation of the crankshaft 26 in the positive rotation direction and inhibiting rotation in the negative rotation direction, a meshing clutch (dog clutch) 120 as depicted in FIG. 11, a dry type engagement device, an electromagnetic friction engagement device (electromagnetic clutch) having an engagement state controlled by an electromagnetic actuator, and a magnetic powder clutch. In short, the lock mechanism may be any mechanism actuated to couple to a non-rotating member a rotating element different from rotating elements respectively coupled to the first electric motor MG1 and the drive wheels 14 in the differential mechanism (i.e., any mechanism non-rotatably fixing the different rotating element).

In FIG. 11, the meshing clutch 120 includes an engine side member 120a including a plurality of meshing teeth on an outer circumference and disposed to be integrally rotated around the same axis as the crankshaft 26, a housing side member 120b that includes a plurality of meshing teeth corresponding to the meshing teeth of the engine side member 120a and that is fixed to the housing 28, a sleeve 120c that includes a spline on an inner circumferential side meshed with the meshing teeth of the engine side member 120a and the housing side member 120b and that is disposed movably (slidably) in the axial direction relative to the engine side member 120a and the housing side member 120b with the spline meshed with the meshing teeth of the engine side member 120a and the housing side member 120b, and an actuator 120d driving the sleeve 120c in the axial direction. The actuator 120d is a hydraulic or electromagnetic actuator moving the sleeve 120c depending on an oil pressure or an electromagnetic force between a state in which the spline disposed on the inner circumferential side is meshed with the meshing teeth of the engine side member 120a and the housing side member 120b and a state in which the spline is meshed only with the meshing teeth of the housing side member 120b and is not meshed with the meshing teeth of the engine side member 120a. As described above, a configuration including the meshing clutch 120 (dog clutch) as the lock mechanism can advantageously suppress an occurrence of dragging of the crankshaft 26 against the housing 28.

In the examples, the second electric motor MG2 may be coupled directly or indirectly via a gear mechanism etc. to the output gear 32, the intermediate output shaft 34, the drive wheels 14, etc., or may be coupled directly or indirectly to a pair of wheels different from the drive wheels 14. If the second electric motor MG2 is coupled to a pair of different wheels, the pair of the different wheels is also included in the drive wheels. In short, the drive wheels driven by the power from the engine 12 may be wheels different from the drive wheels driven by the power from the second electric motor MG2.

In the examples, the planetary gear device 30, the first planetary gear device 106, and the second planetary gear device 108 may be double-planetary planetary gear devices. The planetary gear device 30 may be a differential gear device having a pinion rotationally driven by the engine 12 and a pair of bevel gears that is meshed with the pinion and that is operatively coupled to the first electric motor MG1 and the output gear 32.

The above description is merely an embodiment and the present invention can be implemented in variously modified and improved forms based on the knowledge of those skilled in the art.

NOMENCLATURE OF ELEMENTS

10, 100: hybrid vehicle (vehicle) 12: engine 14: drive wheels 26: crankshaft 28: housing (non-rotating member) 30: planetary gear device (differential mechanism) 80: electronic control device (control device) 104: differential mechanism 120: meshing clutch (lock mechanism) B: brake (lock mechanism) MG1, MG2: first electric motor, second electric motor RE1-RE4: first rotating element-fourth rotating element (rotating element)

The invention claimed is:

1. A vehicle comprising:
a first electric motor; a differential mechanism; a second electric motor coupled to the drive wheels in a power transmittable manner; and a control device,
the differential mechanism comprising a first rotating element coupled to the first electric motor, a second rotating element that is an output rotating member coupled to drive wheels in a power transmittable manner, a third rotating element that is to be coupled to a non-rotating member by actuation of a lock mechanism, and a pinion,
the control device comprising:
a processor; and
a non-transitory memory module storing a computer readable program,
wherein, when the program is executed by the processor during operation of the vehicle in a motor running mode in which the lock mechanism is actuated and first and second drive torques are output from the first and second electric motors, respectively, the processor is configured to control the first drive torque so as not to exceed a predetermined torque upper limit value when the rotation speed of the pinion exceeds a first predetermined rotation speed threshold, and
wherein a requested drive torque is shared between the first and second electric motors.

2. The vehicle of claim 1, wherein
if the rotation speed of the pinion does not exceed the first predetermined rotation speed threshold, the processor is configured to control the first and second electric motors, such that the requested drive torque is shared by the first and second drive torques based on operation efficiency of the first and second electric motors.

3. The vehicle of claim 1, wherein
a crankshaft of an engine is coupled to the third rotating element, so that the crankshaft is fixed to the non-rotating member during operation of the vehicle in the motor running mode.

4. The vehicle of claim 1, wherein
the differential mechanism further comprises a fourth rotating element and a crankshaft of an engine which is coupled to one of the third rotating element and the fourth rotating element, and wherein
during operation of the vehicle in the motor running mode, the processor is configured to put the engine into an operation stop state and to control the first drive torque such that it does not exceed a second predetermined torque upper limit value when a rotation speed of the fourth rotating element exceeds a second predetermined rotation speed threshold.

5. The vehicle of claim 1, wherein
the processor is configured to control the first drive torque such that it does not exceed a second predetermined torque upper limit value when a temperature of lubrication oil of the differential mechanism exceeds a predetermined lubrication oil temperature threshold.

6. The vehicle of claim 1, wherein
the differential mechanism further comprises a planetary gear device having a sun gear serving as the first rotating element, a ring gear serving as the second rotating element, and a carrier serving as the third rotating element, and
the pinion is a pinion gear that is rotatably held by the carrier.

7. The vehicle of claim 4, wherein
the differential mechanism further comprises a first planetary gear device having a first sun gear, a first ring gear and a first carrier; and a second planetary gear device having a second sun gear, a second ring gear and a second carrier, wherein
the first sun gear serves as the first rotating element,
the second sun gear serves as the second rotating element,
the first carrier and the second ring gear are coupled to each other, and cooperate to serve as the third rotating element,
the first ring gear and the second carrier are coupled to each other, and cooperate to serve as the fourth rotating element, and
the pinion comprises a first pinion gear and a second pinion gear that are rotatably held by the respective first and second carriers.

* * * * *